(12) United States Patent
Iijima

(10) Patent No.: US 9,829,877 B2
(45) Date of Patent: Nov. 28, 2017

(54) SERVO CONTROL APPARATUS HAVING FUNCTION OF DISPLAYING ADJUSTMENT STATE IN ONLINE AUTOMATIC ADJUSTMENT TO CONTROL SYSTEM

(71) Applicant: FANUC CORPORATION, Yamanashi (JP)

(72) Inventor: Kazunori Iijima, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/205,019

(22) Filed: Jul. 8, 2016

(65) Prior Publication Data
US 2017/0010602 A1 Jan. 12, 2017

(30) Foreign Application Priority Data
Jul. 9, 2015 (JP) .................. 2015-137974

(51) Int. Cl.
G05B 5/01 (2006.01)
G05B 19/19 (2006.01)
(Continued)

(52) U.S. Cl.
CPC .............. *G05B 19/19* (2013.01); *H02P 27/08* (2013.01); *G05B 2219/41145* (2013.01);
(Continued)

(58) Field of Classification Search
CPC .......... G05B 2219/41145; G05B 19/19; G05B 19/4062; G05B 2219/41166;
(Continued)

(56) References Cited

U.S. PATENT DOCUMENTS 7,063,192 B2 * 6/2006 Mayama ................. G03F 7/709
188/378
7,183,739 B2 * 2/2007 Iwashita ................... H02P 5/52
318/560
(Continued)

FOREIGN PATENT DOCUMENTS

JP 9-128037 A 5/1997
JP 2005-310023 A 11/2005
(Continued)

*Primary Examiner* — Rita Leykin
(74) *Attorney, Agent, or Firm* — Hauptman Ham, LLP

(57) ABSTRACT

A servo control apparatus according to the present invention includes a speed command generator; a torque command generator; a speed detector; a speed control loop; a speed control loop gain setting unit; at least one filter for filtering a specific band of a torque command value; a sinusoidal disturbance input unit for performing a sinusoidal sweep on the speed control loop; a frequency characteristics calculator for estimating the gain and phase of speed control loop input and output signals; a resonance frequency detector; a filter adjuster for adjusting the filter in accordance with a resonance frequency; a gain adjuster; a sequence controller for online and automatically performing the detection of the resonance frequency, the adjustment of the speed control loop gain, and the adjustment of the filter; and an adjustment state display unit. The adjustment state display unit displays a stage and progress in the adjustment by the sequence controller.

3 Claims, 4 Drawing Sheets

(51) Int. Cl.
*H02P 27/08* (2006.01)
*H02P 6/06* (2006.01)

(52) U.S. Cl.
CPC ...... *G05B 2219/41166* (2013.01); *H02P 6/06* (2013.01); *H02P 2203/00* (2013.01)

(58) Field of Classification Search
CPC ........ H02P 2203/00; H02P 27/08; H02P 6/06; G06F 21/575
USPC ........................................ 318/619, 560, 625
See application file for complete search history.

(56) References Cited

U.S. PATENT DOCUMENTS

| | | | | |
|---|---|---|---|---|
| 8,477,444 | B1* | 7/2013 | Zou | G11B 5/59627 |
| | | | | 360/51 |
| 9,304,504 | B2* | 4/2016 | Sonoda | G05B 19/19 |
| 9,360,849 | B2* | 6/2016 | Kawana | G05B 19/416 |
| 9,634,600 | B2* | 4/2017 | Miklosovic | H02P 23/14 |
| 2007/0007926 | A1* | 1/2007 | Iwashita | G05B 19/4141 |
| | | | | 318/625 |
| 2011/0285340 | A1* | 11/2011 | Takeuchi | G05B 19/404 |
| | | | | 318/632 |
| 2013/0030558 | A1* | 1/2013 | Tezuka | G05B 19/408 |
| | | | | 700/94 |
| 2017/0083007 | A1* | 3/2017 | Oda | G05B 19/4166 |

FOREIGN PATENT DOCUMENTS

| | | | |
|---|---|---|---|
| JP | 2006-166600 A | 6/2006 |
| JP | 2008-210273 A | 9/2008 |
| JP | 2011-244668 A | 12/2011 |
| JP | 2013-126266 A | 6/2013 |

\* cited by examiner

FIG. 3A

| AUTOMATIC ADJUSTMENT OF SERVO CONTROL ||
|---|---|
| AXIS | ADJUSTMENT STATE |
| X1 | ADJUSTING FIRST FILTER |
| Y1 | DETECTING SECOND RESONANCE POINT |

FIG. 3B

| AUTOMATIC ADJUSTMENT OF SERVO CONTROL ||
|---|---|
| AXIS | ADJUSTMENT STATE |
| X1 | ADJUSTMENT HAS BEEN INTERRUPTED |
| Y1 | MACHINE IS FIXED |

SERVO CONTROL APPARATUS HAVING FUNCTION OF DISPLAYING ADJUSTMENT STATE IN ONLINE AUTOMATIC ADJUSTMENT TO CONTROL SYSTEM

RELATED APPLICATIONS

The present application claims priority to Japanese Patent Application Number 2015-137974, filed Jul. 9, 2015, the disclosure of which is hereby incorporated by reference herein in its entirety.

BACKGROUND OF THE INVENTION

1. Field of the Invention

The present invention relates to a servo control apparatus, and specifically relates to a servo control apparatus that displays an adjustment state in an online automatic adjustment to a control system.

2. Description of Related Art

Many devices and methods for measuring the frequency characteristics of a control system for a servo control apparatus have been proposed and widely used for measuring the transmission characteristics of a feed axis of a machine tool. Methods for automatically adjusting a control gain are also known.

For example, a method for automatically adjusting a control gain in which a feed axis parameter is identified by simulation using a mathematical model of the feed axis is known (for example, Japanese Unexamined Patent Publication (Kokai) No. 2008-210273). This conventional art has various display means, but cannot display a phase in an online adjustment.

A method for automatically adjusting a filter and a gain by means of generating a vibration while increasing the control gain has also been proposed (for example, Japanese Unexamined Patent Publication (Kokai) No. 2013-126266). This conventional art has only an arithmetic processor, and does not have a display unit to display an adjustment state.

Furthermore, if an external operation is performed during an online automatic adjustment, original mechanical characteristics cannot be measured with precision. This tends to result in a delay in handling an abnormal operation after starting the adjustment.

SUMMARY OF THE INVENTION

The present invention aims to provide a servo control apparatus that is capable of making a safer automatic adjustment of a speed control loop gain and a filter, by means of displaying an adjustment state obtained from an automatic adjustment sequencer and a reason for an interruption or abnormal termination of the adjustment.

A servo control apparatus according to an embodiment of the present invention is a control apparatus for a machine tool having a feed axis driven by a servomotor. The servo control apparatus includes a speed command generator for generating a speed command value for the servomotor; a torque command generator for generating a torque command value for the servomotor; a speed detector for detecting the speed of the servomotor; a speed control loop including the speed command generator, the torque command generator, and the speed detector; a speed control loop gain setting unit for setting a speed control loop gain that is a control gain for the speed control loop; at least one filter for filtering a specific band of the torque command value; a sinusoidal disturbance input unit for performing a sinusoidal sweep on the speed control loop; a frequency characteristics calculator for estimating the gain and phase of speed control loop input and output signals from the output of the speed control loop when a sinusoidal disturbance is inputted to the speed control loop; a resonance frequency detector for detecting a resonance frequency from frequency characteristics; a filter adjuster for adjusting the filter in accordance with the resonance frequency; a gain adjuster for adjusting and verifying the speed control loop gain; a sequence controller for online and automatically performing the detection of the resonance frequency using the resonance frequency detector, the adjustment of the speed control loop gain using the gain adjuster, and the adjustment of the filter using the filter adjuster; and an adjustment state display unit for displaying a stage in an adjustment sequence. The adjustment state display unit displays the adjustment stage and progress in each of the resonance detection, the adjustment and verification of the speed control loop gain, or the adjustment of the filter performed by the sequence controller.

BRIEF DESCRIPTION OF THE DRAWINGS

The objects, features, and advantages of the present invention will be more apparent from the following description of embodiments in conjunction with the attached drawings, wherein:

FIG. 3A is a drawing of a display example when an adjustment state display unit displays a state in the adjustment of a plurality of filters and a state in the detection of a plurality of resonance points;

FIG. 3B is a drawing of a display example when the adjustment state display unit displays a reason for an abnormal termination of an automatic adjustment.

DETAILED DESCRIPTION OF THE INVENTION

A servo control apparatus according to the present invention will be described below with reference to the drawings.

Figure 1:
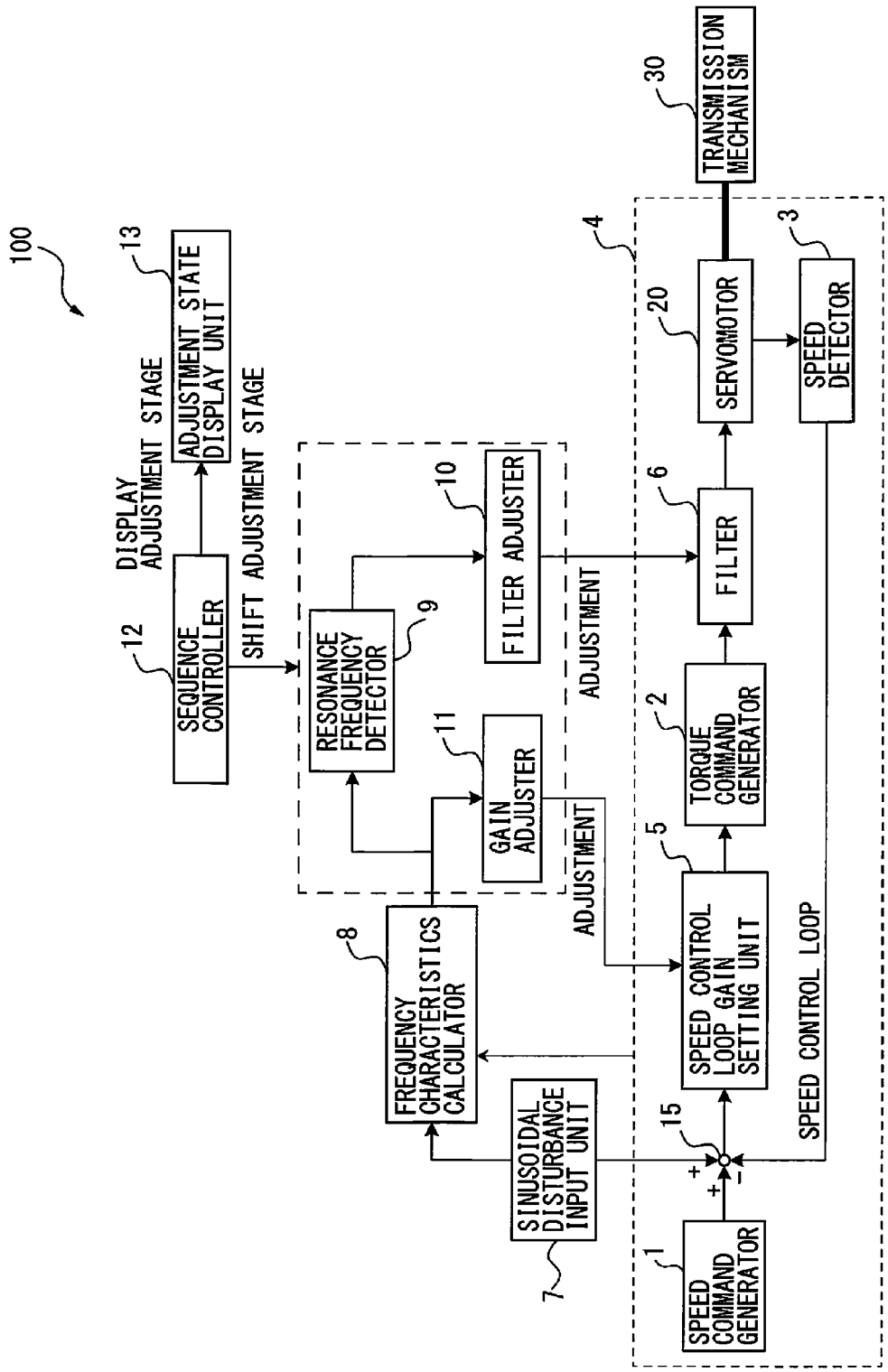
FIG. 1 is a block diagram of a servo control apparatus according to an embodiment of the present invention.

FIG. 1 is a block diagram showing the configuration of a servo control apparatus according to an embodiment of the present invention. A servo control apparatus 100 according to the embodiment of the present invention is a control apparatus for a machine tool having a feed axis driven by a servomotor 20. The servo control apparatus 100 includes a speed command generator 1 for generating a speed command value for the servomotor 20; a torque command generator 2 for generating a torque command value for the servomotor 20; a speed detector 3 for detecting the speed of the servomotor 20; a speed control loop 4 including the speed command generator 1, the torque command generator 2, and the speed detector 3; a speed control loop gain setting unit 5 for setting a speed control loop gain that is a control gain for the speed control loop 4; at least one filter 6 for filtering a specific band of the torque command value; a sinusoidal disturbance input unit 7 for performing a sinusoidal sweep on the speed control loop 4; a frequency characteristics calculator 8 for estimating the gain and phase of speed control loop input and output signals from the output of the speed control loop 4 when a sinusoidal disturbance is inputted to the speed control loop 4; a resonance frequency detector 9 for detecting a resonance frequency from frequency characteristics; a filter adjuster 10 for adjusting the filter 6 in accordance with the resonance frequency; a gain adjuster 11 for adjusting and verifying the speed control loop gain; a sequence controller 12 for online and automatically performing the detection of the resonance frequency using the resonance frequency detector 9, the adjustment of the speed control loop gain using the gain adjuster 11, and the adjustment of the filter 6 using the filter adjuster 10; and an adjustment state display unit 13 for displaying a stage in an adjustment sequence. The adjustment state display unit 13 displays the adjustment stage and progress in each of the resonance detection, the adjustment and verification of the speed control loop gain, or the adjustment of the filter 6 performed by the sequence controller 12.

Next, the operation of the servo control apparatus according to the embodiment of the present invention will be described. First, the speed command generator 1 generates a speed command value to drive the servomotor 20, and outputs the speed command value to an adder 15. The adder 15 adds a sinusoidal disturbance inputted from the sinusoidal disturbance input unit 7 to the speed command value, and subtracts a speed detection value of the servomotor 20 detected by the speed detector 3. The adder 15 outputs a calculation result to the speed control loop gain setting unit 5.

The speed control loop gain setting unit 5 sets a control gain adjusted by the gain adjuster 11 for the speed control loop 4.

The torque command generator 2 calculates the product of the calculation result of the adder 15 and the speed control loop gain, and output a torque command to drive the servomotor 20. The servomotor 20 operates a driver (not shown) through a transmission mechanism 30.

The speed control loop 4 includes the speed command generator 1, the torque command generator 2, and the speed detector 3.

The filter 6 filters a specific band of the torque command value. In the servo control apparatus 100 according to the embodiment of the present invention shown in FIG. 1, only one filter is provided by way of example. However, a plurality of filters may be provided.

The sinusoidal disturbance input unit 7 performs a sinusoidal sweep on the speed control loop 4.

The frequency characteristics calculator 8 estimates the gain and phase of speed control loop input and output signals from the output of the speed control loop 4 when the sinusoidal disturbance is inputted to the speed control loop 4 of the servo control apparatus 100. Furthermore, the frequency characteristics calculator 8 expresses the output of the speed control loop 4 as the Fourier series having an arbitrary number of terms using a disturbance input frequency from the sinusoidal disturbance input unit 7 as a fundamental frequency, and calculates the amplitude and phase of a fundamental component of the Fourier series in order to calculate frequency characteristics online.

The resonance frequency detector 9 detects a resonance frequency from the frequency characteristics. The filter adjuster 10 adjusts the filter 6 in accordance with the resonance frequency detected by the resonance frequency detector 9.

The gain adjuster 11 adjusts and verifies the speed control loop gain. The sequence controller 12 online and automatically performs the detection of the resonance frequency using the resonance frequency detector 9, the adjustment of the speed control loop gain using the gain adjuster 11, and the adjustment of the filter 6 using the filter adjuster 10.

The adjustment state display unit 13 displays a stage in an adjustment sequence. More specifically, the adjustment state display unit 13 displays the adjustment stage and progress in each of the resonance detection, the adjustment and verification of the speed control loop gain, or the adjustment of the filter 6 performed by the sequence controller 12. The adjustment state display unit 13 is provided with a monitor to display the adjustment stage and progress as described above. As the monitor, although not limited to, a liquid crystal display, an organic EL display, a plasma display, a fluorescent display, or the like is available.

Figure 2A:
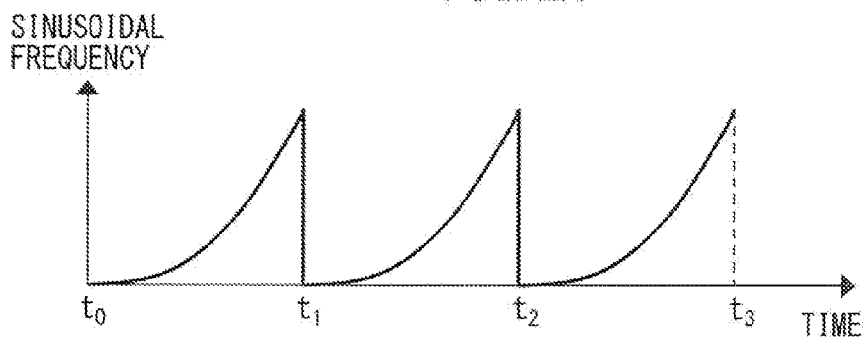
FIG. 2A is a graph showing a variation in a sinusoidal frequency with time in the servo control apparatus according to the embodiment of the present invention.

Next, the operation of the servo control device according to the embodiment of the present invention will be described. FIG. 2A is a graph showing a variation in a sinusoidal frequency, which is a disturbance input to be applied from the sinusoidal disturbance input unit 7 to the speed control loop 4, with time. In FIG. 2A, the sinusoidal frequency increases between a time $t_0$ and a time $t_1$, and returns to an initial value at the time $t_1$. Likewise, the sinusoidal frequency increases between the time $t_1$ and a time $t_2$, and returns to the initial value at the time $t_2$. The sinusoidal frequency continues varying in a like manner. The period between the time $t_0$ and the time $t_1$ is referred to as a first period. The period between the time $t_1$ and the time $t_2$ is referred to as a second period. The period between the time $t_2$ and the time $t_3$ is referred to as a third period.

Figure 2B:
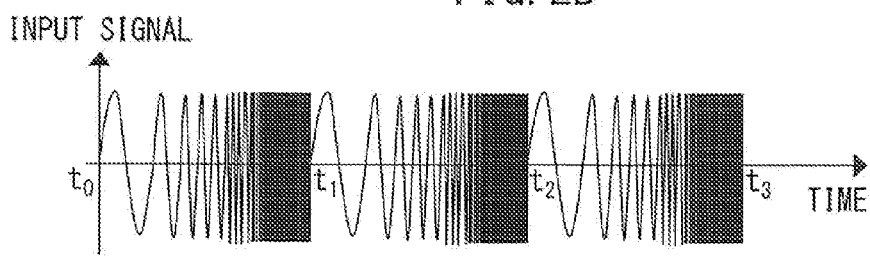
FIG. 2B is a graph showing a variation in an input signal with time in the servo control apparatus according to the embodiment of the present invention.
Figure 2C:
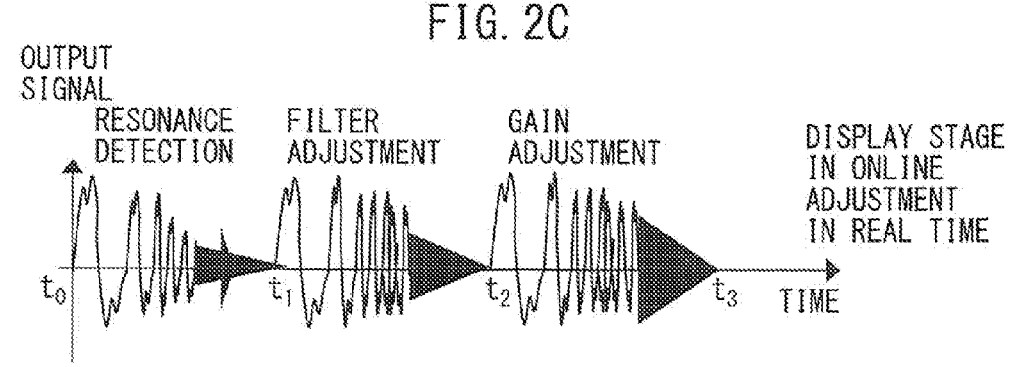
FIG. 2C is a graph showing a variation in an output signal with time in the servo control apparatus according to the embodiment of the present invention.
Figure 2D:
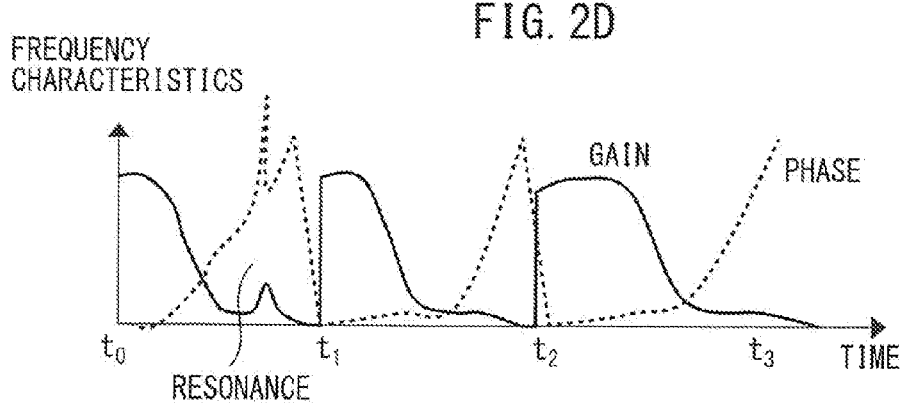
FIG. 2D is a graph showing a variation in the frequency characteristics of a gain and a phase with time in the servo control apparatus according to the embodiment of the present invention.

FIG. 2B shows a variation in an input signal of the speed control loop 4 with time. FIG. 2C shows a variation in an output signal of the speed control loop 4 with time. The frequency characteristics calculator 8 estimates the gain and phase of the speed control loop input and output signals from the output of the speed control loop 4 when the sinusoidal disturbance input unit 7 inputs the sinusoidal disturbance to the speed control loop 4. FIG. 2D shows variations in the gain (solid line) and phase (dotted line) estimated by the frequency characteristics calculator 8 with time. In this embodiment, the sequence controller 12 performs the resonance detection in the first period, the filter adjustment in the second period, and the gain adjustment in the third period by way of example.

Next, in the servo control apparatus according to the embodiment of the present invention, display examples will be described in a situation where the adjustment state display unit 13 displays a stage in the adjustment sequence. FIG. 3A shows a display example in which a state in the adjustment of a plurality of filters and a state in the detection of a plurality of resonance points are displayed. For example, FIG. 3A displays that a first filter is in the process of being adjusted with respect to an axis X1, and a second resonance point is in the process of being detected with respect to an axis Y1. However, not limited to this display example, other states may be displayed as states in the adjustment of the plurality of filters and the detection of the plurality of resonance points by the sequence controller 12.

FIG. 3B shows a display example in which a reason for an abnormal termination of the automatic adjustment is displayed. For example, FIG. 3B displays that the adjustment has been interrupted with respect to the axis X1, and a machine is fixed with respect to the axis Y1. However, not limited to this display example, another reason may be displayed as a reason for the abnormal termination of the automatic adjustment.

According to the servo control apparatus of the embodiment of the present invention, the provision of a notification means that notifies an operator of a sequential state and a factor of a fail provides the effect that the operator can rapidly recognize an abnormality of a machine.

Figure 4:
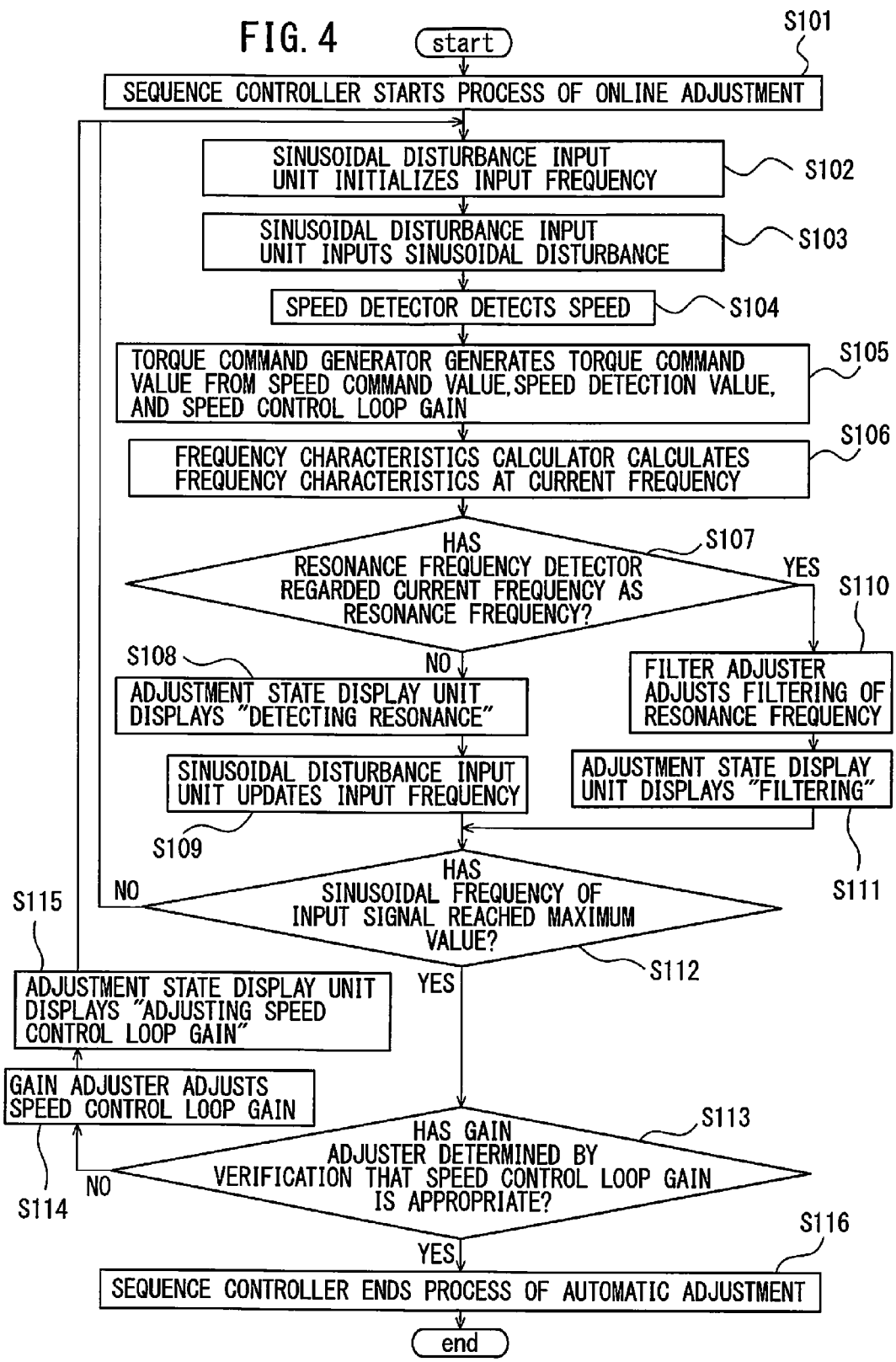
FIG. 4 is a flowchart of the operation procedure of the servo control apparatus according to the embodiment of the present invention.

Next, the operation process of the servo control apparatus according to the embodiment of the present invention will be described with reference to a flowchart shown in FIG. 4. In step S101, the sequence controller 12 (see FIG. 1) starts the process of online adjustment of the speed control loop gain and the filter. Next, in step S102, the sinusoidal disturbance input unit 7 initializes an input frequency.

Next, in step S103, the sinusoidal disturbance input unit 7 inputs a sinusoidal disturbance to the speed control loop 4. Next, in step S104, the speed detector 3 detects the speed of the servomotor 20.

Next, in step S105, the torque command generator 2 generates a torque command value from a speed command value, a speed detection value, and the speed control loop gain. Next, in step S106, the frequency characteristics calculator 8 calculates frequency characteristics at a current frequency.

Next, in step S107, whether or not the resonance frequency detector 9 has regarded the current frequency as a resonance frequency is determined.

When the resonance frequency detector 9 has not regarded the current frequency as the resonance frequency, the adjustment state display unit 13 displays state of "detecting resonance" in step S108. After that, in step S109, the sinusoidal disturbance input unit 7 updates the input frequency.

On the other hand, when the resonance frequency detector 9 has regarded the current frequency as the resonance frequency in step S107, the filter adjuster 10 adjusts filtering of the resonance frequency in step S110. Next, in step S111, the adjustment state display unit 13 displays state of "filtering".

Next, in step S112, whether or not the sinusoidal frequency of an input signal has reached a maximum value is determined. When the sinusoidal frequency of the input signal has not reached the maximum value, steps S102 to S112 are repeated.

When the sinusoidal frequency of the input signal has reached the maximum value, the gain adjuster 11 verifies the speed control loop gain and determines whether or not the speed control loop gain is appropriate in step S113.

When the gain adjuster 11 determines that the speed control loop gain is inappropriate by the verification, the gain adjuster 11 adjusts the speed control loop gain in step S114. Next, in step S115, the adjustment state display unit 13 displays state of "adjusting speed control loop gain".

On the other hand, when the gain adjuster 11 determines that the speed control loop gain is appropriate by the verification in step S113, the sequence controller 12 ends the process of automatic adjustment of the speed control loop gain and the filter in step S116.

As described above, the servo control apparatus according to the embodiment of the present invention displays an adjustment state obtained from the automatic adjustment sequencer and a reason for an interruption or abnormal termination of the adjustment in order to enable a safer automatic adjustment to the speed control loop gain and the filter.

According to the servo control apparatus of the embodiment of the present invention, it is possible to provide a servo control apparatus that can make a safer automatic adjustment to the speed control loop gain and the filter by means of displaying an adjustment state obtained from the automatic adjustment sequencer and a reason for an interruption or abnormal termination of the adjustment.

What is claimed is:

1. A servo control apparatus for a machine tool having a feed axis driven by a servomotor, comprising:
   a speed command generator for generating a speed command value for the servomotor;
   a torque command generator for generating a torque command value for the servomotor;
   a speed detector for detecting the speed of the servomotor;
   a speed control loop including the speed command generator, the torque command generator, and the speed detector;
   a speed control loop gain setting unit for setting a speed control loop gain that is a control gain for the speed control loop;
   at least one filter for filtering a specific band of the torque command value;
   a sinusoidal disturbance input unit for performing a sinusoidal sweep on the speed control loop;
   a frequency characteristics calculator for estimating the gain and phase of speed control loop input and output signals from the output of the speed control loop when a sinusoidal disturbance is inputted to the speed control loop;
   a resonance frequency detector for detecting a resonance frequency from frequency characteristics;
   a filter adjuster for adjusting the filter in accordance with the resonance frequency;
   a gain adjuster for adjusting and verifying the speed control loop gain;
   a sequence controller for online and automatically performing the detection of the resonance frequency using the resonance frequency detector, the adjustment of the speed control loop gain using the gain adjuster, and the adjustment of the filter using the filter adjuster; and
   an adjustment state display unit for displaying a stage in an adjustment sequence, wherein
   the adjustment state display unit displays the adjustment stage and progress in each of the resonance detection, the adjustment and verification of the speed control loop gain, or the adjustment of the filter performed by the sequence controller.

2. The servo control apparatus according to claim 1, wherein when the sequence controller performs an adjustment of a plurality of filters, the adjustment state display unit displays an adjustment state of each of the filters.

3. The servo control apparatus according to claim 1, wherein the adjustment state display unit displays a reason for an interruption or abnormal termination of the adjustment.

* * * * *